June 15, 1948.  A. J. AIKENS  2,443,529
DIRECTIONAL ANTENNA SYSTEM
Filed June 25, 1946
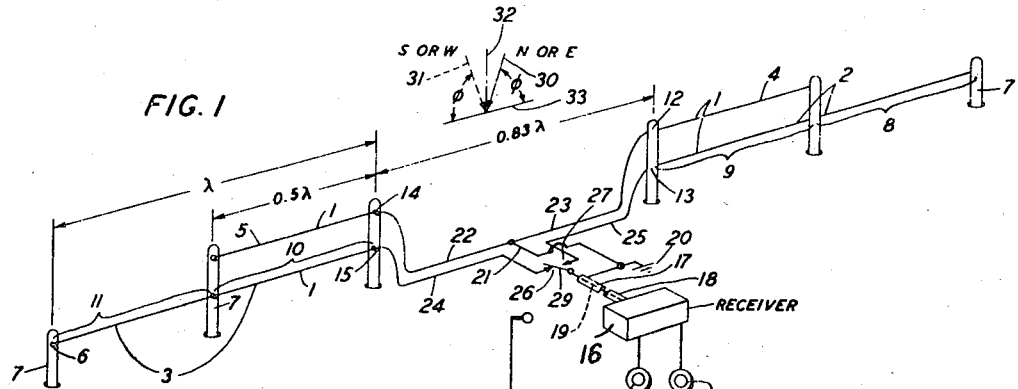
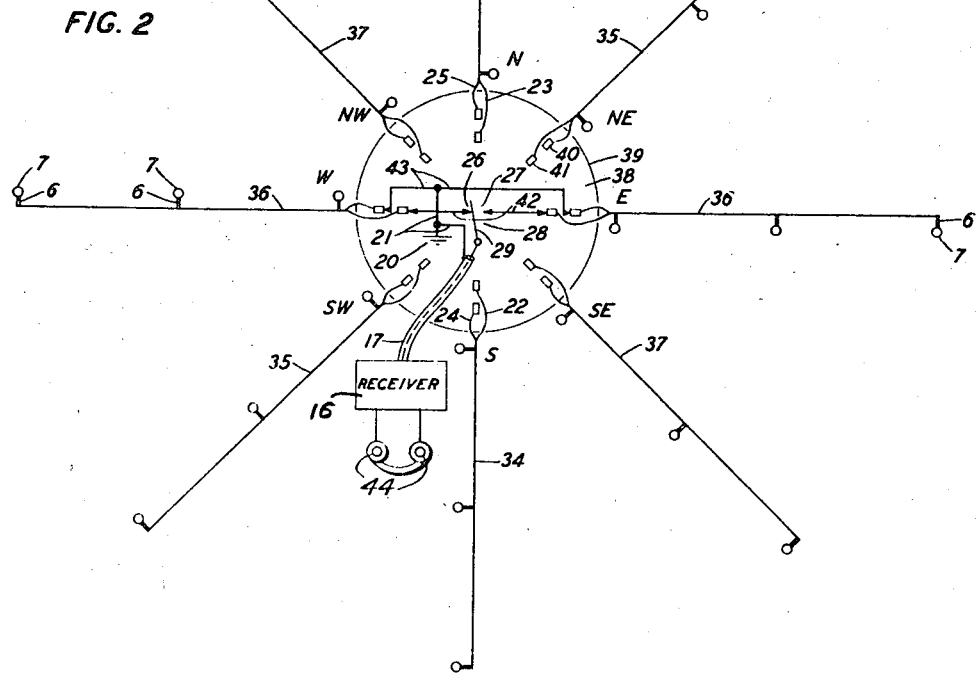
INVENTOR
A. J. AIKENS
BY
*a. J. Zerbarini*
ATTORNEY Patented June 15, 1948

2,443,529

UNITED STATES PATENT OFFICE 2,443,529

DIRECTIONAL ANTENNA SYSTEM

Andrew J. Aikens, Boonton, N. J., assignor to Bell Telephone Laboratories, Incorporated, New York, N. Y., a corporation of New York Application June 25, 1946, Serial No. 679,074

9 Claims. (Cl. 343—120)

This invention relates to directive antenna systems and particularly to methods and means for determining the directional sense and path of radio waves.

As is known, short-wave direction finding systems comprising a non-directional vertical antenna and a directional antenna, such as a simple vertical loop or an Adcock loop, and long-wave directive antennas such as the wave antenna and the Marconi L-type antenna, have been employed for ascertaining the sense or compass "point" direction and the path or "line" direction of incoming waves. In general, these antennas operate satisfactorily only when the incoming wave polarization is substantially vertical, or tilted, and only when the wave propagation direction is horizontal or forms a small, or so-called "low," angle, say less than about 60 degrees, with the azimuthal plane. Since the short waves are usually propagated via the Heaviside layer, the low angle incoming directions correspond to sky short waves which have been propagated over a long distance or range; and since the long waves are ground waves having tilted wave fronts, these horizontally propagated waves are also long range waves. In other words, the aforementioned prior art systems are ordinarily not suitable for determining the point direction and line direction of incoming waves propagated over a short or long distance and having a large or so-called high angle, that is, an angle of 60 degrees or more. Inasmuch as short wave systems in which the range is short and the incoming waves have a high angle, are now employed, it appears desirable to obtain a direction finding antenna for determining the directional sense and azimuthal path of such waves.

It is one object of this invention to ascertain the directional sense, and the direction in the horizontal plane, of waves having in the vertical plane a direction forming with the horizontal plane any angle less than 90 degrees.

It is another object of this invention to determine the sense and direction of short waves propagated a short distance and via the Heaviside layer.

In accordance with one embodiment of the invention a high-angle short wave direction finding antenna system comprises a horizontal wire wavelength long and two separate co-linear horizontal wires each a wavelength long and positioned below the first-mentioned wire. The adjacent extremities of the two lower wires are approximately opposite the mid-point of the upper wire. A receiver is connected to the aforesaid mid-point and, by means of a switch, alternately to the above-mentioned adjacent extremities. By comparing the received intensities, the directional sense of the incoming wave may be ascertained; and by utilizing several systems such as described above the azimuthal line direction of the waves may be determined.

The invention will be more fully understood from a perusal of the following specification taken in conjunction with the drawing on which like reference characters denote elements of similar function and on which:

Fig. 1 is a perspective view of one embodiment of the invention; and

Fig. 2 is a plan view of another embodiment of this invention.

Referring to Fig. 1, there is shown a double-wire sense-determining antenna system 1 comprising a pair of co-linear low antenna elements 2, 3 each a wavelength long, and a pair of co-linear high antenna elements 4, 5 each a half wavelength long, the four elements being in the same vertical plane, substantially. The elements 2, 3, 4 and 5 may be wires or tubular conductors and are supported on insulators 6 attached to the wooden poles 7. The element 2 comprises the near-end half wave section 8 and the far-end half wave section 9; and element 3 comprises the near-end half wave section 10 and the far-end half wave section 11. As shown on the drawing, the high elements 4 and 5 are positioned above, and spaced approximately a half meter from the near-end sections 8 and 10, respectively, and the low elements 2 and 3 are about a half meter above the ground surface. Terminal 12 of high element 4 is directly above terminal 13 of the low element 2, and terminal 14 of high element 5 is directly above terminal 15 of the low element 3. Reference numeral 16 denotes a short wave receiver and numeral 17 denotes a coaxial line connected thereto and comprising an outer conductor 18 and an inner conductor 19, the outer conductor being connected to the ground 20. The receiver includes a beat frequency oscillator for producing an audible tone from the incoming carrier, and a set of head-phones 44 connected to the receiver output. The grounded outer line conductor 18 is connected through a main conductor or lead 21 and the two branch conductors 22, 23 to the terminals 12, 14 of the high elements 4 and 5. Reference numerals 24 and 25 denote branch line conductors connected respectively to terminals 13, 15 of low elements 2 and 3 and to the left and right contacts 26 and 27 of a two-pole switch 28. The armature 29 of switch 28 is connected to the inner conductor of coaxial line 17. Hence switch 29 constitutes a means for alternatively connecting low elements 2 and 3 to receiver 16.

In operation, Fig. 1, low element 2 or 3 is connected through switch 28 to the receiver 16 and the energies induced in the connected low element and the two high elements 4 and 5, by an incoming sky wave having a direction 30 or 31 making with the horizontal or ground plane an angle $\phi$ greater than 70 degrees, are conveyed to the receiver. As shown in Fig. 1, the directional sense of the wave 30 is opposite that of wave 31. More particularly, the vertical and horizontal lines 32 and 33 represent respectively the zenith and azimuthal directions; and the incoming wave directions included in the right angle denoted "N or E" have a "north" or "east" directional sense, whereas the incoming wave directions included in the right angle denoted "S or W" have a "south" or "west" directional sense. Assuming for the moment and for the purpose of this explanation, that the high elements 4 and 5 are absent, the intensity of the received energy is not appreciably changed by switching the receiver from one low antenna element to the other low antenna element. In short, in this assumed arrangement, the front-to-back ratio is unity or slightly less, and the directional sense of the incoming wave cannot be determined.

Now it has been actually found that when the high elements 4 and 5 are in place, as shown in Fig. 1, and the receiver 16 is rapidly switched between the two low elements 2 and 3, the received intensities for the two positions of the switch 16 differ greatly, the front-to-back ratio being considerably greater than unity. More specifically, when the low element 2 or 3 pointing towards or in the general direction of the distant station emitting the incoming wave is connected to receiver 16, the received intensity is greater than that obtained when this low element is connected to the receiver and the high wires 4 and 5 are omitted. On the other hand, when the other low element 3 or 2, that is, the low element pointing away from the distant station, is connected to the receiver 16, the received intensity is smaller than that secured when this last-mentioned low element is connected to the receiver and the high elements 4 and 5 are omitted. Hence, the directional sense or point direction of the incoming wave may be readily ascertained. As is discussed below in connection with Fig. 2, in a series of actual tests, the system of Fig. 1 was successfully used for determining the directional sense of waves propagated over several short range distances.

Referring to Fig. 2, there are shown four sense-determining double-wire antenna systems 34, 35, 36 and 37 aligned respectively with the north-south, northeast-southwest, east-west and southeast-northwest directions, each double-wire system being similar to the double-wire system 1 of Fig. 1. A switching arrangement or means 38 is provided for connecting the receiver 16 alternatively to antennas 34, 35, 36 and 37. The switching arrangement 38 comprises a wooden baseboard 39, an outer set of eight terminals or contacts 40, an inner set of eight contacts 41, both sets being on board 39 and radially disposed respectively on outer and inner concentric circles, a rotatable arm 42 for connecting any pair of opposite outer contacts 40 to ground 20, and a rotatable double arm 43 for connecting the two opposite inner contacts 39 adjacent to the aforesaid opposite outer contacts 40 to the two contacts of switch 28. Each of the outer contacts 40 is connected to a different high element branch line 22 or 23; and each of the inner contacts 41 is connected to a different low element branch line 24 or 25.

In operation, the path, and then the directional sense, of the incoming wave are ascertained. In determining the wave path the armature 29 of switch 28 remains in contact with one of the switch contacts as, for example, the left contact 26 and the arms 41 and 42 are simultaneously rotated so as to connect one low element and the two high elements of antennas 34, 35, 36 and 37 in succession to receiver 16. The intensities of the energies induced in the four antennas by the incoming wave, the line and point direction of which it is desired to determine, are compared at the receiver 16. Since the horizontal antenna most nearly aligned with the direction $\theta$ of the incoming wave receives the greatest amount of energy, as explained in Patent 924,168, G. Marconi, June 8, 1909, the approximate path of the wave is readily determined. With the receiver 16 connected to the double wire antenna most nearly aligned with the wave path, the directional sense is determined by alternately connecting the receiver between the low elements 2 and 3 of the aforesaid antenna, as explained in connection with Fig. 1.

While the theory of the sense determining feature is not clearly understood, successful sense determining observations were made in a series of tests. In this set of tests a mobile transmitter traveled due west, substantially, on its outward trip and due east on its return trip. The east-west antenna 36 only was utilized and tests were made at several transmitter locations such as 80, 120 and 200 miles. For the 80-mile location, a front-to-back ratio of about four decibels was obtained, that is, the energy received when the west low element or wire 3 of antenna 36 was connected to the receiver was greater than that received when the east low element 2 of this antenna was connected to the receiver. Disconnecting the high elements 4, 5 from the receiver 16 and the ground 20 reversed the front-to-back ratio, the energy received with the east low element 2 connected the receiver being about 1 decibel greater than received with the west low element 3 connected to the receiver.

With the transmitter at 120 miles and with the high elements disconnected, a unity front-to-back ratio was obtained, whereas with the high elements connected a six-decibel ratio was obtained, the reception obtained with the west low element connected being greater than that secured with the east low element connected. At 200 miles, with the high elements disconnected a front-to-back ratio of about 2 or 3 decibels in the right direction, west greater than east, was secured and with the high elements connected a front-to-back ratio of about 8 decibels in the right direction was obtained. In an additional test, observations on a broadcast station 500 miles away revealed no appreciable difference between the front-to-back ratios obtained with the high wire connected and disconnected.

In practice, the order of magnitude of the propagation distance or range of the incoming wave is preferably ascertained, as explained below, before determining the directional sense of the incoming wave. Thus, assuming the high elements are disconnected, the received wave does not fade and the front-to-back ratio is large, the incoming wave is in all probability a ground wave propagated over a short distance, say up to about 50 miles. Also, assuming the high elements are disconnected and the received wave fades, if the ratio is large the incoming wave is most likely a sky wave and the incoming angle is most likely low, so that the propagation range is relatively great, that is, in the order of 500 miles or more. On the other hand, if the ratio is small, in all probability the incoming sky wave has a high incoming angle and the propagation range is relatively small, that is, in the order of 100 to 200 miles. Assuming the range is in the order just mentioned, the high elements are connected to the system and the directional sense determined as previously explained. Hence, the invention may be utilized to determine the order of magnitude of the distance to the unknown remotely located transmitting station.

In five other tests the mobile transmitter traveled to geographical points unknown to the operators at the receiving station and located at 50, 63, 90, 104 and 112 miles from the receiving system. The true bearing for these locations were, respectively, 359, 322, 359, 15 and 335 degrees, referred to north, and the respective measured bearings were 359, 300, 355, 22.5 and 330 degrees. Hence, as shown by these tests, both the line direction and the point direction of the incoming waves were determined with a high degree of accuracy.

Although the invention has been explained in connection with a specific embodiment it is not to be limited thereto inasmuch as other apparatus may be successfully used in practicing the invention.

What is claimed is:

1. In combination, a pair of vertically spaced substantially horizontal antenna members having comparable lengths, a receiver, and means for connecting said receiver between one extremity of the lower member and the mid-point of the upper member.

2. A combination in accordance with claim 1, a portion of the lower member being directly beneath the upper member and the remaining portion of said lower member extending beyond said upper member.

3. In combination, a first substantially horizontal antenna member, a second horizontal linear antenna member positioned vertically below one-half portion of the first member, said members having substantially equal lengths, the mid-point of said first member and one extremity of said second member being connected to opposite terminals of a receiver.

4. In combination, a pair of colinear horizontal antenna elements having equal lengths, a third horizontal antenna element having a length equal to the total length of said colinear elements, the adjacent or uncorrespondent extremities of said colinear elements being connected to one terminal, and one extremity of said third element being connected to the other terminal of a receiver.

5. In combination, a pair of high colinear antenna elements each approximately a half wavelength long, a pair of low colinear antenna elements each approximately a wavelength long, each of the last-mentioned elements being positioned below a different one of the first-mentioned elements, a receiver, means for connecting the uncorrespondent extremities of said high elements to one terminal of said receiver, and means comprising a switch for alternatively connecting the uncorrespondent extremities of said low elements to the other terminal of said receiver.

6. A combination in accordance with claim 5, the said uncorrespondent terminals of said high elements being directly above the uncorrespondent terminals of said low elements.

7. A combination in accordance with claim 5, said low horizontal antenna elements being spaced approximately an eighth wavelength and said high horizontal antenna elements being spaced approximately a quarter wavelength, from the earth's surface.

8. A double wire antenna for determining the directional sense of an incoming wave comprising a pair of high co-linear horizontal antenna elements each approximately a half wavelength long, a pair of low co-linear horizontal antenna elements each approximately a wavelength long and comprising an inner and an outer half wave portion, one high element being directly above and spaced approximately an eighth wavelength from the inner half wave portion of one low element, the other high element being directly above and spaced approximately an eighth wavelength from the inner half wave portion of the other low element, a receiver, and connecting means for simultaneously connecting the adjacent uncorrespondent extremities of the high elements to one terminal of the receiver and alternatively connecting the adjacent uncorrespondent extremities of the low elements to the other terminal of the receiver.

9. An antenna system for determining the azimuthal path and directional sense of an incoming wave comprising a double wire antenna extending north and south, a second double wire antenna extending northeast and southwest, a third double wire antenna extending east and west and a fourth double wire antenna extending southeast and northwest, each double wire antenna comprising a pair of colinear high elements and a pair of colinear low elements, a receiver, and means for successively connecting said receiver to said antennas, said means including means for simultaneously connecting the uncorrespondent extremities of said high elements, and alternatively connecting the uncorrespondent extremities of said low elements, to said receiver.

ANDREW J. AIKENS.

REFERENCES CITED

The following references are of record in the file of this patent:

UNITED STATES PATENTS

| Number | Name | Date |
| --- | --- | --- |
| 924,168 | Marconi | June 8, 1909 |
| 1,214,591 | Reuthe | Feb. 6, 1917 |
| 1,424,365 | Loflin et al. | Aug. 1, 1922 |